(12) United States Patent
Park et al.

(10) Patent No.: US 11,528,074 B2
(45) Date of Patent: Dec. 13, 2022

(54) REPEATER SYSTEM FOR LPWAN AND METHOD FOR CONTROLLING SAME

(71) Applicant: AMOTECH CO., LTD., Incheon (KR)

(72) Inventors: Jaeil Park, Hwaseong-si (KR); Hyungil Baek, Yongin-si (KR); Chanwoo Lee, Yongin-si (KR); Yonggil Jo, Goyang-si (KR)

(73) Assignee: AMOTECH CO., LTD., Incheon (KR)

( * ) Notice: Subject to any disclaimer, the term of this patent is extended or adjusted under 35 U.S.C. 154(b) by 0 days.

(21) Appl. No.: 17/416,460

(22) PCT Filed: Dec. 3, 2019

(86) PCT No.: PCT/KR2019/016895
§ 371 (c)(1),
(2) Date: Jun. 18, 2021

(87) PCT Pub. No.: WO2020/130419
PCT Pub. Date: Jun. 25, 2020

(65) Prior Publication Data
US 2022/0077920 A1    Mar. 10, 2022

(30) Foreign Application Priority Data
Dec. 18, 2018    (KR) .......................... 10-2018-0163749

(51) Int. Cl.
*H04B 7/15*    (2006.01)
*H01Q 3/02*    (2006.01)
(Continued)

(52) U.S. Cl.
CPC ............. *H04B 7/1555* (2013.01); *H01Q 3/30* (2013.01); *H01Q 5/48* (2015.01); *H04B 17/12* (2015.01); *H04B 17/21* (2015.01)

(58) Field of Classification Search
CPC . H04B 7/15; H04B 7/155; H01Q 1/50; H01Q 3/30; H01Q 5/44; H01Q 21/00; H01Q 3/02; H01Q 3/32
See application file for complete search history.

(56) References Cited

U.S. PATENT DOCUMENTS

| 6,904,266 B1 * | 6/2005 | Jin ..................... H04B 7/15571 370/293 |
| 2004/0147287 A1 * | 7/2004 | Nelson, Jr. ............... H01Q 3/26 455/562.1 |

(Continued)

FOREIGN PATENT DOCUMENTS

| CN | 101401326 | 4/2009 |
| CN | 107408976 | 11/2017 |

(Continued)

OTHER PUBLICATIONS

International Search Report dated Mar. 20, 2020 in International Patent Application No. PCT/KR2019/016895.

(Continued)

*Primary Examiner* — Blane J Jackson
(74) *Attorney, Agent, or Firm* — Capitol IP Law Group, PLLC

(57) ABSTRACT

A repeater system for LPWAN according to the present invention is characterized by comprising: a first antenna and a second antenna which may be antennas for transmission or reception according to a user's selection; a switch which is coupled to each of the first antenna and the second antenna; an RF transmission end and an RF reception end which are connected to the first antenna and the second antenna through the switch; and a control unit for controlling the switching of the switch and for controlling the RF transmission end and the RF reception end, wherein the first antenna is a multi-directional dipole antenna, and the second antenna (Continued)

includes a directional antenna for receiving and transmitting signals in a single direction.

5 Claims, 5 Drawing Sheets

(51) Int. Cl.
*H04B 7/155* (2006.01)
*H01Q 5/48* (2015.01)
*H01Q 3/30* (2006.01)
*H04B 17/12* (2015.01)
*H04B 17/21* (2015.01)

(56) References Cited

U.S. PATENT DOCUMENTS

| | | | | |
|---|---|---|---|---|
| 2007/0117514 A1* | 5/2007 | Gainey | ............... | H01Q 19/10 455/25 |
| 2012/0218156 A1* | 8/2012 | Mohammadian | ...... | H01Q 1/241 343/730 |
| 2016/0269132 A1 | 9/2016 | Clark et al. | | |
| 2017/0265087 A1* | 9/2017 | Kolokotronis | ........ | H04W 16/28 |
| 2018/0199326 A1* | 7/2018 | Lotter | ................ | H04B 7/15507 |
| 2019/0215936 A1* | 7/2019 | Hartung | ................ | H04L 63/104 |
| 2020/0403689 A1* | 12/2020 | Rofougaran | ........ | H04W 52/245 |

FOREIGN PATENT DOCUMENTS

| | | | |
|---|---|---|---|
| KR | 10-2016-0076734 | 7/2016 | |
| KR | 10-2017-0139882 | 12/2017 | |
| WO | 2012/031154 | 3/2012 | |
| WO | WO-2014126161 A1 * | 8/2014 | ............. H01Q 1/005 |

OTHER PUBLICATIONS

Written Opinion of the International Searching Authority dated Mar. 20, 2020 in International Patent Application No. PCT/KR2019/016895.

* cited by examiner

[FIG. 1]
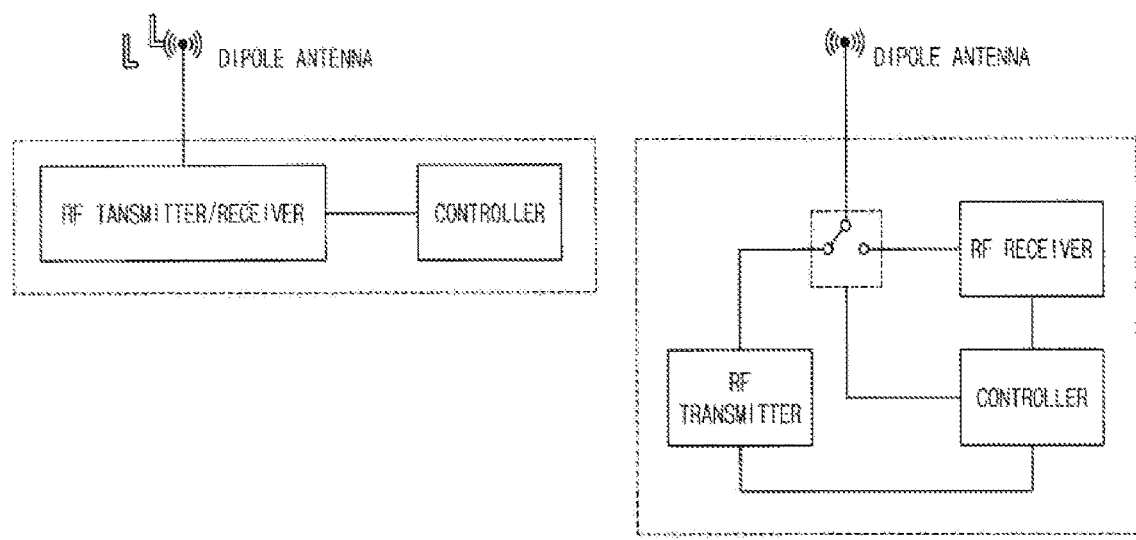

[FIG.2]
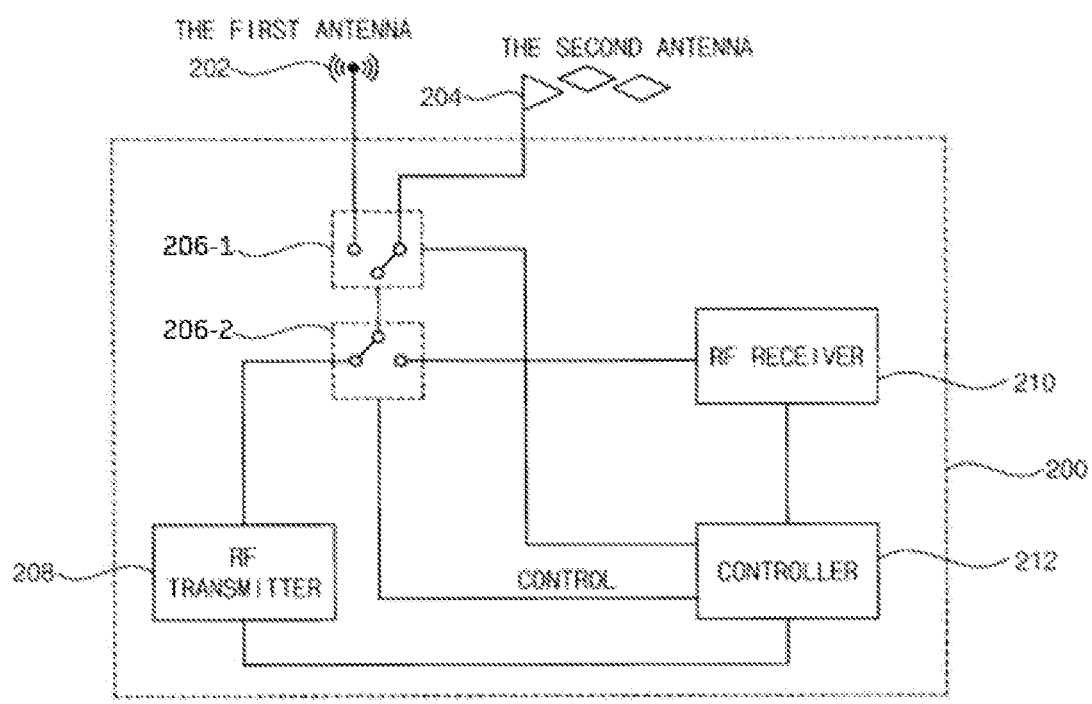

[FIG. 3]
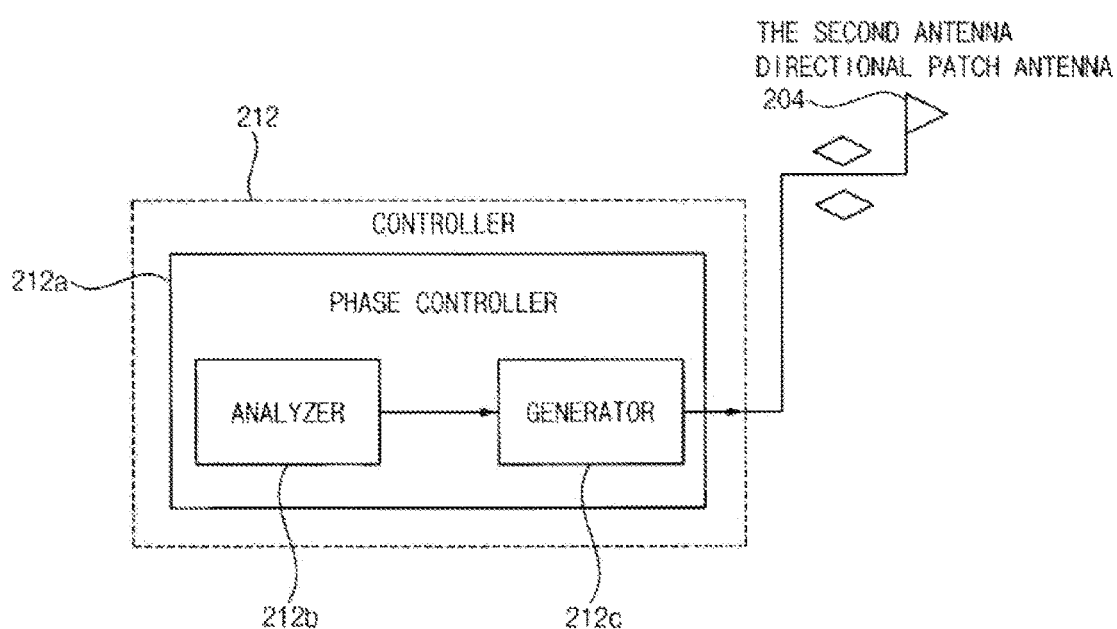

[FIG. 4]
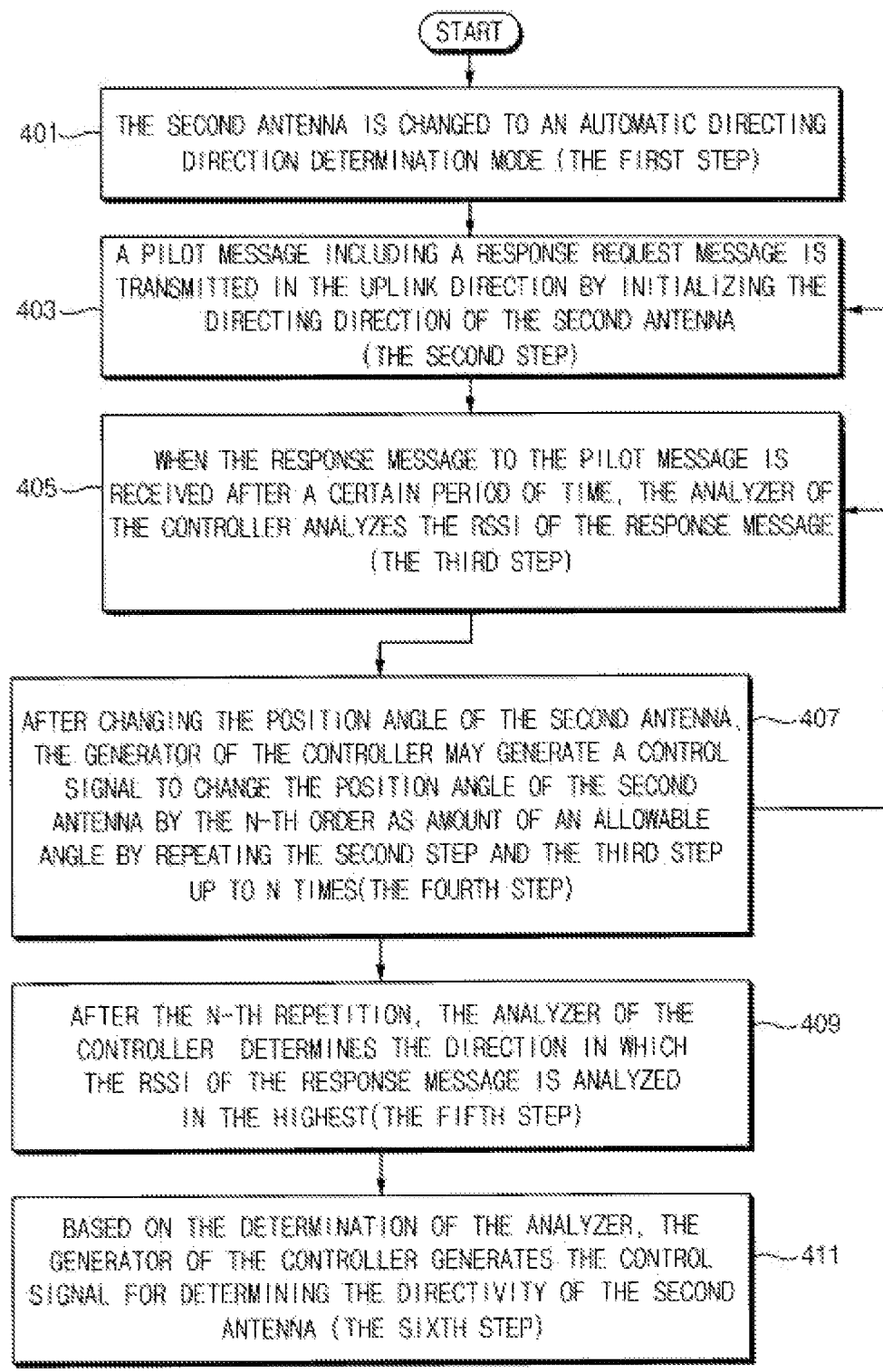

[FIG. 5]
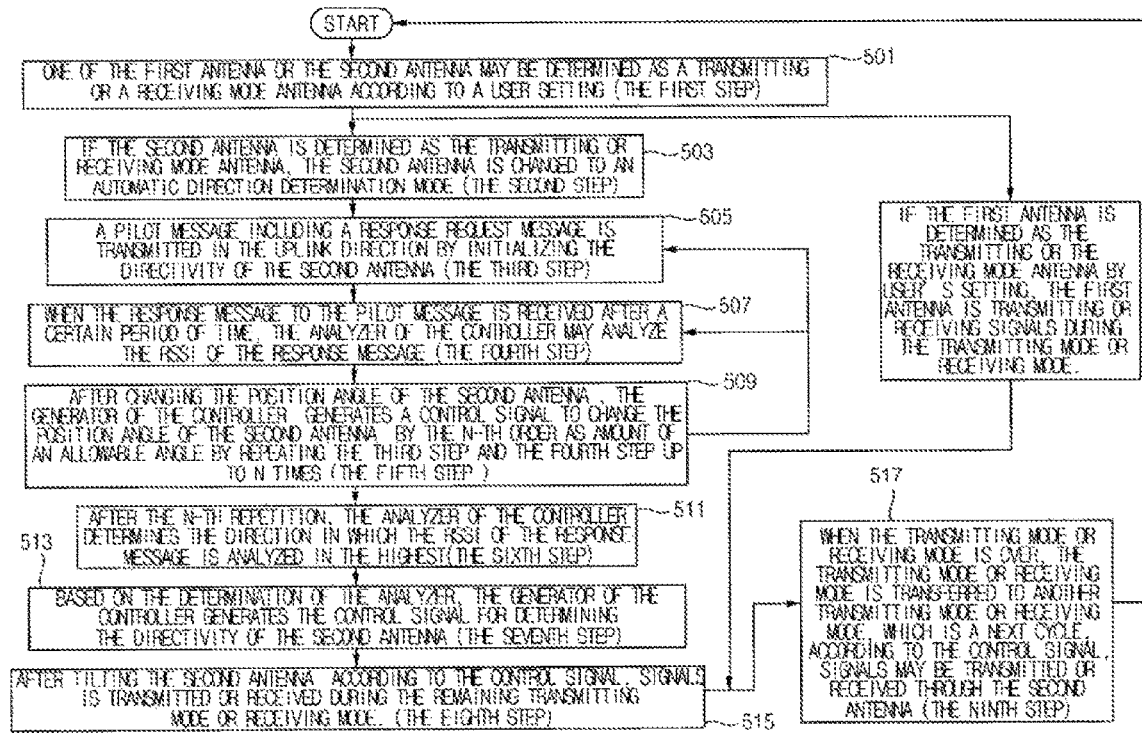

REPEATER SYSTEM FOR LPWAN AND METHOD FOR CONTROLLING SAME

TECHNICAL FIELD

The present disclosure relates to a repeater system for a Low-Power Wide-Area Network (LPWAN) and a control method thereof, and more particularly, to the repeater system for the LPWAN using the patch antenna and the control method thereof.

DISCUSSION OF THE RELATED ART

A repeater may be used to improve a quality of wireless communication between a wireless device and a wireless communication access point, such as a cell tower. The repeater may improve the quality of wireless communication by applying amplification, filtering, and/or other processing techniques to uplink and downlink signals communicated between the wireless device and the wireless communication access point.

The repeater for the Low-Power Wide-Area Network (LPWAN) band, which is a low-power long-distance communication network, has the effect of extending the receiving coverage of the base station by installing it at the critical point of the receiving coverage of the LPWAN band base station.

In addition, by installing the repeater in the receiving coverage, a critical point of the shadow area and a weak field of the receiving coverage of the LPWAN band base station, a service for the shadow area or an uplink message transmission in the weak field of the LPWAN band are possible.

In addition, when the LPWAN band device using a built-in antenna is installed alone and transmits the LPWAN band uplink message, the base station receives the uplink message. In particular, in the case of a device used in the SIGFOX system using the LPWAN band, it cannot be confirmed that the transmitted data has been reliably received by the receiving device because the data is transmitted in the broadcasting method. (SIGFOX: A platform and solution built by SIGFOX company of France using ultra narrow-band modulation technology to build a dedicated network for things with low data usage.)

Therefore, when the repeater is installed in the SIGFOX system, the reception probability in the base station can be further increased because the received uplink message in repeater can be amplified and transmitted to the base station safely.

However, in an environment in which several communication devices are mixed, there is a need for a method for reliable communication of only device using the LPWAN band.

In the currently used repeater for LPWAN band, a dipole antenna is used for transmitting and receiving. In this case, the signal of other nearby devices having greater signal strength in addition to the signal of device that allows the LPWAN band can be received in the repeater for LPWAN band and transmitted to the base station. However, there may be a problem that the repeater system for LPWAN cannot receive the signal from the target device to be received.

Accordingly, there is a need for a new proposal of an antenna for the repeater to improve communication performance with the device that allows to be received from the repeater for the LPWAN.

SUMMARY

Technical Problem

To solve the above problem and defects, it is an object of the present disclosure to provide an antenna configuration for a receiver and transmitter of a repeater system for a LPWAN in a wireless communication network that can provide higher transmit/receive sensitivity according to the communication environment.

Technical Solution

According to an aspect of the present disclosure, there is provided a repeater system for a Low-power wide-area network (LPWAN) comprising; a first antenna and a second antenna that selected to an antenna for transmitting or receiving mode according to a user's setting; a switch coupled to each of the first antenna and the second antenna; a RF transmitter connected to the first antenna and the second antenna through the switch; a RF receiver; and a controller for controlling the RF transmitter and the RF receiver through switching of the switch, wherein the first antenna is a dipole antenna having multiple directivities, the second antenna is a directional patch antenna for transmitting and receiving signals in one direction.

In an embodiment of the present disclosure, the controller includes a phase controller for controlling a directivity of the second antenna.

In an embodiment of the present disclosure, the phase controller of the controller includes an analyzer analyzing a Received Signal Strength Indicator (RSSI) of the signal received in response to a pilot message including a response request message, a generator generating a control signal to change a position angle of the second antenna with n-th order as amount of an allowable angle, transmitting the pilot message including the response request message in a uplink direction after changing the position angle of the second antenna, generating a control signal for controlling a directivity of the second antenna based on the information analyzed by the analyzer.

In an embodiment of the present disclosure, the controller includes control steps as a first step for changing to an automatic direction determination mode in the second antenna, a second step for transmitting a pilot message including a response request message in a uplink direction by initializing the directivity of the second antenna, a third step for analyzing the RSSI of the response message in an analyzer when the response message to the pilot message is received after a certain period of time, a fourth step for generating a control signal, in a generator of controller, to change a position angle of the second antenna by the n-th order as amount of an allowable angle by repeating the second step and the third step up to n times, a fifth step for determining the direction in which the RSSI of the response message is analyzed in the highest in the analyzer after the n-th repetition, a sixth step for generating a control signal for determining the directivity of the second antenna in the generator based on the determination of the analyzer.

According to an aspect of the present disclosure, in a repeater for a Low-power wide-area network (LPWAN) including a first antenna and a second antenna that selected to an antenna for transmitting or receiving according to a user's setting, a switch coupled to each of the first antenna and the second antenna, a RF transmitter connected to the first antenna and the second antenna through the switch, a RF receiver; and a controller for controlling the RF transmitter and the RF receiver through switching of the switch, a method of controlling the repeater system for the LPWAN comprising: a first step for determining one of the first antenna or the second antenna as a transmitting or receiving mode according to a user setting; a second step for changing to an automatic direction determination mode of the second antenna, if the second antenna is determined as the transmitting or receiving mode antenna; a third step for transmitting a pilot message including a response request message in a uplink direction by initializing a directivity of the second antenna; a fourth step for analyzing a RSSI of the response message in an analyzer, when the response message for the pilot message is received after a certain period of time; a fifth step for generating a control signal, in a generator of controller, to change the position angle of the second antenna by the n-th order as amount of an allowable angle by repeating the third step and the fourth step up to n times, a sixth step for determining the direction in which the RSSI of the response message is analyzed in the highest in the analyzer of the controller, after the n-th repetition; a seventh step for generating a control signal for determining the directivity of the second antenna in the generator of the controller based on the determination of the analyzer; an eighth step for transmitting or receiving signals during the remaining transmitting or receiving mode, after tilting the second antenna according to the control signal; and a ninth step for transmitting or receiving signals through the second antenna, when the transmitting or receiving mode is over, the transmitting or receiving mode is transferred to another transmitting or a receiving mode, which is the next cycle, according to the control signal.

In an embodiment of the present disclosure, if the first antenna is determined as the transmitting or receiving mode antenna according to the user setting, the first antenna transmits or receives signals during the transmitting or receiving mode period.

Advantageous Effects

The present invention has the effect of providing a higher transmission/reception sensitivity according to the communication environment by providing the antenna configuration for the receiver/transmitter of the repeater system for the LPWAN in the wireless communication network.

In addition, in the environment in which several communication devices are mixed, there is an effect that only devices using the LPWAN band can reliably perform communication.

However, the effects of the present invention are not limited to the above effects, and may be variously expanded without departing from the spirit and scope of the present invention.

BRIEF DESCRIPTION OF THE DRAWINGS

FIG. 1 is a diagram showing the structure of a commercial (existing) repeater system for a LPWAN.

FIG. 2 is a diagram showing the structure of a repeater system for the LPWAN according to an embodiment of the present invention.

FIG. 3 is a diagram illustrating a functional block diagram of a controller in the repeater system for the LPWAN according to an embodiment of the present invention.

FIG. 4 is a flowchart for determining a directivity of a second antenna in a phase controller of a controller of FIG. 3 according to an embodiment of the present invention.

FIG. 5 is a flowchart illustrating an operation process of the repeater system for the LPWAN according to an embodiment of the present invention.

DETAILED DESCRIPTION OF THE EMBODIMENTS

Hereinafter, exemplary embodiments of the present disclosure will be described in detail with reference to the accompanying drawings, which will be readily apparent to those skilled in the art to which the present disclosure pertains.

The present disclosure may be embodied in many different forms and is not limited to the embodiments described herein. In the drawings, parts not relating to the description are omitted for clarifying the present disclosure, and the same reference numerals are assigned to the same or similar components throughout the specification.

FIG. 1 shows the structure of a commercial(existing) repeater system for a LPWAN. Referring to the drawings, as one dipole antenna, the role of the transmitting or receiving antenna is alternately performed. That is, while the receiver of the repeater system may receive down data, the transmitter of the repeater system may not transmit uplink data.

In addition, while a received data from the receiver of the repeater system is transmitted through the transmitter of the repeater system to the base station, the receiver of the repeater system may not receive other data. Due to this unidirectional transmission/reception characteristic, the repeater system for the LPWAN may be implemented in a low cost and a small size.

This invention may intend to suggest a method for improving a performance and a high data transmission success rate while maintaining the characteristics of the repeater system for the LPWAN.

FIG. 2 is a diagram showing the structure of a repeater system for a LPWAN according to an embodiment of the present invention.

The repeater system 200 may comprise a first antenna 202 and a second antenna 204 for transmitting or receiving, switches 206-1 and 206-2 coupled to the first antenna 202 and the second antenna 204, respectively, a RF transmitter 208 connected to the first antenna 202 and the second antenna 204 through the switches 206-1 and 206-2, a RF receiver 210 and a controller 212 that controls the switches 206-1 and 206-2, the RF transmitter 208 and the RF receiver 210.

The controller 212 may include a control circuit to transmit or receive a first signal and a second signal through a first receiving path or a second receiving path which is connected a first transmitting path, a second transmitting path, or the RF receiver 210, which are connected to the RF transmitter 208 through the switches 206-1 and 206-2 coupled to the first antenna 202 and the second antenna 204, respectively.

The first antenna 202 may be a dipole antenna having multiple directivities, the second antenna 204 may be a directional patch antenna that transmits or receives a signal in one direction. The first antenna 202 and the second antenna 204 may be respectively set as a transmitting antenna or a receiving antenna through the switches 206-1 and 206-2 by a user's selection.

The first antenna 202 and the second antenna 204 may be to vary the application of the transmitting and receiving antenna according to the use environment by applying the switches 206-1 and 206-2. Particularly, when it is desired to transmit only in a shaded area or a specific area, the second antenna 204, which is the directional patch antenna, may be selected as the transmitting or receiving antenna to transmit and receive the signal with a higher S/N.

FIG. 3 may be a diagram illustrating a functional block diagram of the controller 212 for determining the directivity of the second antenna in the repeater system 200.

Referring to FIG. 3, the controller 212 may include a phase controller 212a that controls the directivity of the second antenna 204.

The phase controller 212a may include an analyzer 212b for analyzing the direction in which a signal from the device allowed in the LPWAN band and a generator 212c that generates an antenna control signal for controlling the directivity of the second antenna 204.

That is, the analyzer 214b of the phase controller 214a may serve to analyze a Received Signal Strength indicator (RSSI) of the signal received in response to a pilot message including a response request message.

The analyzer 212b may serve to determine the direction of the signal coming from the device allowed in the LPWAN band or whether there is the shadow area. The analyzer 212b may determine the antenna directivity as the direction of the signal coming from the device.

The generator 212c of the phase controller 212a may generate a control signal to change the position angle of the second antenna with n-th order as amount of an allowable angle. After changing a position angle of the second antenna, the generator 212c of the phase controller may transmit the pilot message including the response request message in the uplink direction. The generator 212c of the phase controller may generate a control signal for controlling the directivity of the second antenna based on the information analyzed by the analyzer 212b.

FIG. 4 is a flowchart for determining the directivity of a second antenna 204 in a phase controller 212a of the controller of FIG. 3 according to an embodiment of the present invention.

The second antenna 204 may be changed to an automatic direction determination mode (The first step, 401). The pilot message including a response request message may be transmitted in the uplink direction by initializing the directivity of the second antenna 204 (The second step, 403)

When the response message for the pilot message is received after a certain period of time, the analyzer 212b of the controller may analyze the RSSI of the response message (The third step, 405).

After changing the position angle of the second antenna 204, the generator 214c of the controller may generate a control signal to change the position angle of the second antenna 204 by the n-th order as amount of an allowable angle by repeating the second step and the third step up to n times (The fourth step, 407)

After the n-th repetition, the analyzer 212b of the controller 212 may determine the direction in which the RSSI of the response message is analyzed in the highest (The fifth step, 409)

Based on the determination of the analyzer 212b, the generator 212c of the controller 212 may generate a control signal for determining the directivity of the second antenna 204 (The sixth step, 411).

After tilting the second antenna 204 according to the control signal, other signals are transmitted during the remaining transmission mode.

When the second antenna 204 is set as a transmitting or receiving antenna using the switches 206-1 and 206-2 in the repeater system 200, the directivity of the second antenna 204 may be determined in the above-mentioned manner.

FIG. 5 is a flowchart illustrating an operation process of the repeater system 200 for LPWAN according to an embodiment of the present invention.

According to the embodiment of the present invention, the repeater system 200 may comprise a first antenna 202 and a second antenna 204 for transmitting or receiving, switches 206-1 and 206-2 coupled to the first antenna 202 and the second antenna 204, respectively, a RF transmitter 208 connected to the first antenna 202 and the second antenna 204 through the switches 206-1 and 206-2, a RF receiver 210 and a controller 212 that controls the switches 206-1 and 206-2, the RF transmitter 208 and the RF receiver 210.

First, one of the first antenna or the second antenna may be determined as a transmitting mode antenna or a receiving mode antenna according to a user setting (The first step, 501).

If the second antenna is determined as the transmitting mode antenna or the receiving mode antenna, the second antenna 204 may be changed to an automatic direction determination mode (The second step, 503).

A pilot message including a response request message may be transmitted in the uplink direction by initializing the directivity of the second antenna (The third step, 505)

When the response message to the pilot message is received after a certain period of time, the analyzer 212b of the controller may analyze the RSSI of the response message (The fourth step, 507).

After changing the position angle of the second antenna 204, the generator 212c of the controller may generate a control signal to change the position angle of the second antenna 204 by the n-th order as amount of an allowable angle by repeating the third step and the fourth step up to n times (The fifth step, 509)

After the n-th repetition, the analyzer 212b of the controller 212 may determine the direction in which the RSSI of the response message is analyzed in the highest (The sixth step, 511)

Based on the determination of the analyzer 212b, the generator 212c of the controller 212 may generate a control signal for determining the directivity of the second antenna 204 (The seventh step, 513).

After tilting the second antenna 204 according to the control signal, signals may be transmitted or received during the remaining transmitting mode or receiving mode. (The eighth step, 515).

When the transmitting mode or receiving mode is over, the transmitting mode or receiving mode is transferred to another transmitting mode or receiving mode, which is a next cycle, according to the control signal, signals may be transmitted or received through the second antenna (The ninth step, 517)

If the first antenna 202 is determined as the transmitting mode antenna or the receiving mode antenna by user's setting, the first antenna 202 may be transmitting or receiving signals during the transmitting mode or receiving mode.

The repeater system 200 can increase the receiving efficiency of the signal from the device allowed in the LPWAN in the environment in which several communication devices are mixed through using the second antenna 204, such as the directional patch antenna.

The control unit 212 of the repeater system 200 may select an antenna with good transmission efficiency among the first antenna 202 and the second antenna 204 through the switching 206-1 and 206-2 based on the strength of signal sent as the pilot signal. This makes it possible to efficiently transmit signals received from the device allowed in the LPWAN to the base station.

Therefore, it can be said that the repeater system capable of increasing transmission efficiency while increasing reception strength compared to the prior art is constructed.

As described above, the present disclosure has been described with respect to particularly preferred embodiments. However, the present disclosure is not limited to the above embodiments, and it is possible for one who has an ordinary skill in the art to make various modifications and variations, without departing off the spirit of the present disclosure.

[DESCRIPTION OF INDEX]

| | |
|---|---|
| 200: REPATER | 202: THE FIRST ANTENNA |
| 204: THE SECOND ANTENNA | 206: SWITCH |
| 208: RF TRANSMITTER | 210: RF RECEIVER |
| 212: CONTROLLER | |

What is claimed is:

1. A repeater system for a Low-power wide-area network (LPWAN) comprising;
   a first antenna and a second antenna that selected to an antenna for transmitting or receiving mode according to a user's setting;
   switches coupled to each of the first antenna and the second antenna; a RF transmitter connected to the first antenna and the second antenna through the switches; a RF receiver; and a controller for controlling the RF transmitter and the RF receiver through switching of the switches,
   wherein the first antenna is a dipole antenna having multiple directivities, the second antenna is a directional patch antenna for transmitting and receiving signals in one direction,
   wherein the controller includes control steps as a first step for changing to an automatic direction determination mode in the second antenna, a second step for transmitting a pilot message including a response request message in an uplink direction by initializing a directivity of the second antenna, a third step for analyzing a RSSI of the response message in an analyzer when the response message to the pilot message is received after a certain period of time, a fourth step for generating a control signal, in a generator of controller, to change a position angle of the second antenna by the n-th order as amount of an allowable angle by repeating the second step and the third step up to n times, a fifth step for determining the direction in which the RSSI of the response message is analyzed in the highest in the analyzer after the n-th repetition, a sixth step for generating a control signal for determining the directivity of the second antenna in the generator based on the determination of the analyzer.

2. The repeater system for the LPWAN of claim 1, wherein the controller includes a phase controller for controlling the directivity of the second antenna.

3. The repeater system for the LPWAN of claim 2, wherein the phase controller of the controller includes an analyzer analyzing a Received Signal Strength Indicator (RSSI) of the signal received in response to a pilot message including a response request message, a generator generating a control signal to change the position angle of the second antenna with n-th order as amount of an allowable angle, transmitting the pilot message including the response request message in an uplink direction after changing the position angle of the second antenna, generating a control signal for controlling the directivity of the second antenna based on the information analyzed by the analyzer.

4. In a repeater for a Low-power wide-area network (LPWAN) including a first antenna and a second antenna that selected to an antenna for transmitting or receiving according to a user's setting, switches coupled to each of the first antenna and the second antenna, a RF transmitter connected to the first antenna and the second antenna through the switches, a RF receiver; and a controller for controlling the RF transmitter and the RF receiver through switching of the switches, a method of controlling the repeater system for the LPWAN comprising:
   a first step for determining one of the first antenna or the second antenna as a transmitting or receiving mode according to a user setting;
   a second step for changing to an automatic direction determination mode of the second antenna, if the second antenna is determined as the transmitting or receiving mode antenna,
   a third step for transmitting a pilot message including a response request message in the uplink direction by initializing the directivity of the second antenna;
   a fourth step for analyzing a RSSI of the response message in the analyzer, when the response message for the pilot message is received after a certain period of time;
   a fifth step for generating a control signal to change the position angle of the second antenna by the n-th order as amount of an allowable angle by repeating the third step and the fourth step up to n times,
   a sixth step for determining the direction in which the RSSI of the response message is analyzed in the highest in the analyzer of the controller, after the n-th repetition;
   a seventh step for generating a control signal for determining the directivity of the second antenna in the generator of the controller based on the determination of the analyzer;
   an eighth step for transmitting or receiving signals during the remaining transmitting or receiving mode, after tilting the second antenna according to the control signal; and
   a ninth step for transmitting or receiving signals through the second antenna, when the transmitting or receiving mode is over, the transmitting or receiving mode is transferred to another transmitting or a receiving mode, which is the next cycle, according to the control signal.

5. The method of controlling the repeater system for the LPWAN of claim 4, if the first antenna is determined as the transmitting or receiving mode antenna according to the user setting, the first antenna transmits or receives signals during the transmitting or receiving mode period.

* * * * *